Aug. 15, 1933.  B. DWOFSKY  1,922,761
FOOD CHOPPING MACHINE
Filed May 19, 1931  2 Sheets-Sheet 2
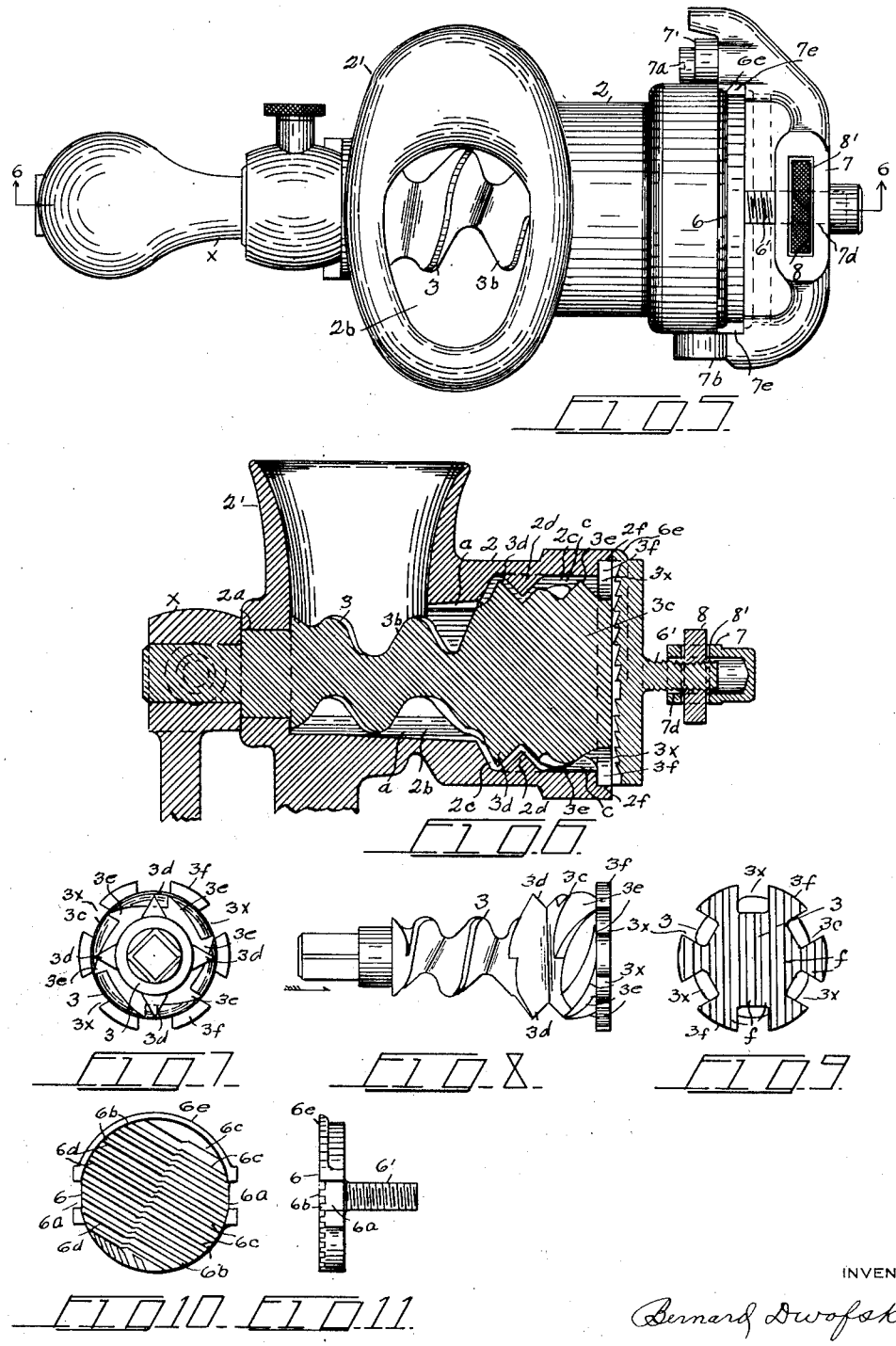
INVENTOR
Bernard Dwofsky
BY
Harry Dr Wallace
ATTORNEY.

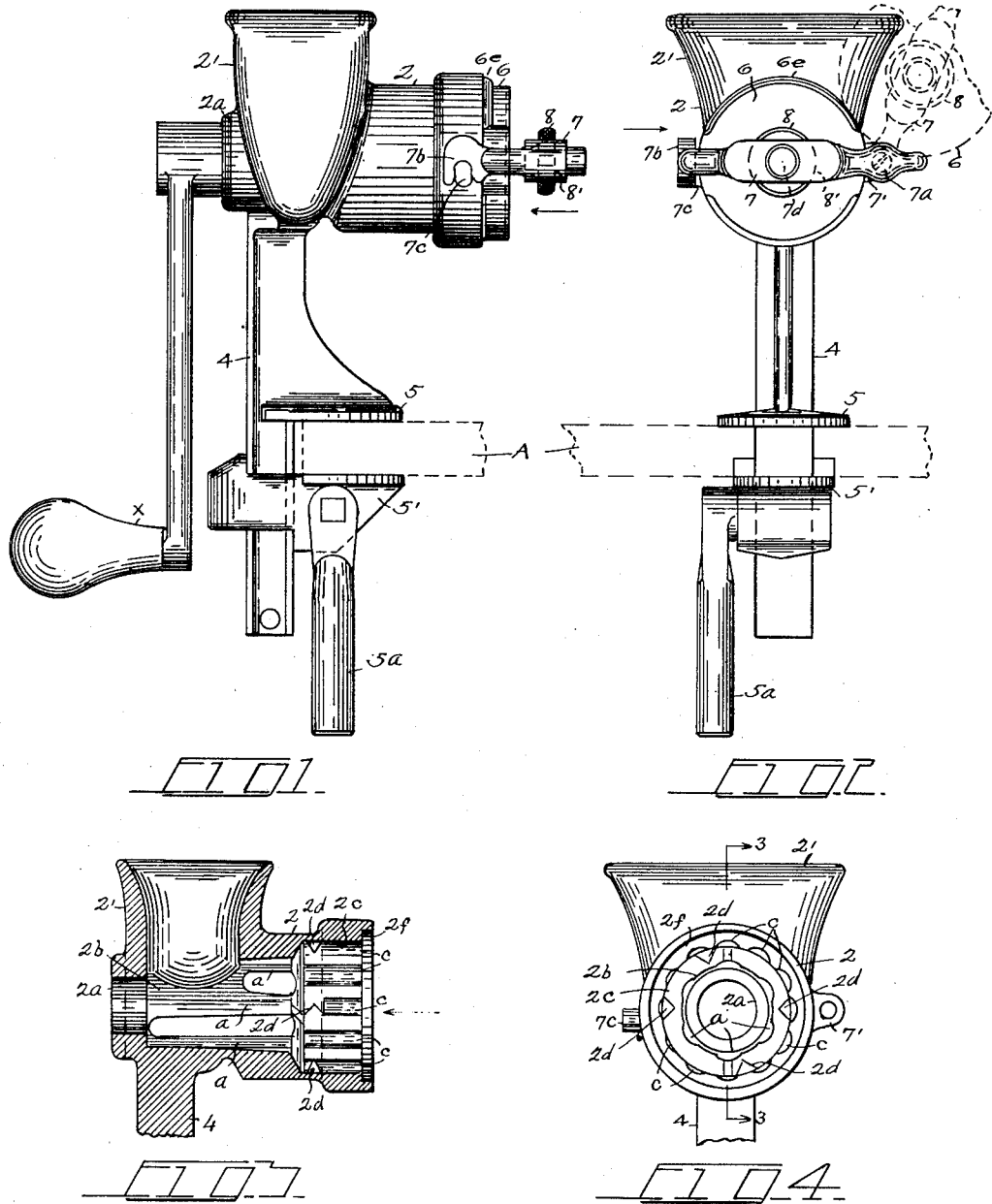

Patented Aug. 15, 1933

1,922,761

UNITED STATES PATENT OFFICE 1,922,761

FOOD CHOPPING MACHINE

Bernard Dwofsky, Syracuse, N. Y., assignor of two-thirds to Benjamin E. Horton and Donovan W. Horton, Syracuse, N. Y.

Application May 19, 1931. Serial No. 538,497

6 Claims. (Cl. 146—189)

This invention relates to improvements in meat and other food-chopping or mincing machines, and has for its primary object to effect a rapid and relatively fine reduction of various articles of food, thereby increasing the efficiency and output of the machine. A further object is to provide an extremely simple and rapid food chopper comprising a novel housing formed with a feed-hopper, and disposing therein a worm conveyor of novel construction, which is formed with radial cutting spurs and spiral cutting ribs or blades, whereby said conveyor itself primarily effects the rapid disintegration of the food products, without the aid of knives or other extra parts. This primary chopping or reduction is effected by complementary parts, that are integral respectively with the inner walls of the housing, and with the conveyor. A further object is to provide a novel external nonrotating cutting element, which receives the primarily reduced products, via a series of radial openings formed in the head of the conveyor, and which performs the final chopping work. This external cutting element is preferably disc-shaped and mounted in a swingable gate or holder, which is equipped with simple means for adjusting the said element relatively to the head of the conveyor for varying the fineness of the finished product. The provision of said radial openings and the peculiar shape and arrangement of the external cutting disc tends to effect the equal distribution of the product over the grinding face of said disc, and insures the even, progressive and rapid final reduction of meat and other food products.

The various features and parts of the invention will be understood from the detailed description which follows, and by reference to the accompanying drawings, in which—

Figure 1 is a side elevation, taken from the direction of the arrow in Fig. 2. Fig. 2 is an end elevation of the same, taken in the direction of the arrow in Fig. 1. Fig 3 is a broken central longitudinal section on line 3—3 of Fig. 4, the conveyor being omitted. Fig. 4 is a broken end elevation, taken in the direction of the arrow in Fig. 3, with conveyor and the adjustable external grinding member and its support removed. Fig. 5 is an enlarged top plan view of the complete machine. Fig. 6 is an enlarged central vertical longitudinal section taken on line 6—6 of Fig. 5. Fig. 7 is an end elevation of the conveyor taken in the direction of the arrow in Fig. 8. Fig. 8 is a side elevation of the conveyor alone. Fig. 9 is an elevation of the enlarged end of the conveyor of Fig. 8. Fig. 10 is an end elevation of the external grinding disc. And Fig. 11 is a side elevation of the same.

In the drawings, 2 represents a substantially hollow casing or body having an integral upstanding hopper 2', through which meat, vegetables and other food products may gravitate towards the interior of the barrel 2, in which is disposed a worm conveyor 3, the latter having a solid shank that journals in a bearing 2a, and the free end of said shank being squared to receive a handle x, by which the worm may be rotated. The portion 3b of the conveyor 3 that is disposed within the receiving chamber 2 of the casing is preferably a normal screw, that conveys the meat towards an expanded contiguous aligning chamber 2c. The portion of the conveyor 3 that occupies the chamber 2c is also preferably enlarged, as at 3c, and is formed with a plurality of sharp radial spurs 3d (see Figs. 6 and 8), that are disposed in shearing relation to similar inwardly projecting spurs 2d of the casing, whereby the meat and other products upon emerging from chamber 2b, are primarily cut and reduced by said spurs and are thence carried forward by a plurality of spiral cutting ribs or blades 3e, as shown in Figs. 6 and 8. The ribs 3e are preferably spaced equidistantly around the enlarged portion 3c of the worm, as shown in Figs. 7 and 8, and cut and effect a continuous forcible movement of the products towards the flange head, as 3f, of the worm, and finally eject the still further reduced products from the casing 2 by means of a series of radial openings, as 3x, which are formed in the periphery of said head (see Figs. 7, 8 and 9). The primary chamber 2b of the casing is preferably formed with a relatively coarse arrangement of shallow parallel longitudinal flutes or grooves a, as shown in Figs. 3 and 4, that cooperate with the normal portion of the worm to effect the positive forward movement or feed of the meat under the pressure exerted by the worm 3, and tend to prevent any portion of the body of the meat from rotating with the worm and thereby retard the said movement. The walls of the chamber 2c are similarly fluted or grooved longitudinally, as at c (Figs. 3 and 4), for the purpose of further facilitating the cutting, as well as the positive movement of the products towards the discharge openings 3x, as described. The enlarged end of casing 2 is normally open and counter-bored, as at 2f in Figs. 3 and 6, to receive the flange 3f of the worm. The provision of the complementary spurs, ribs and flutes tends to greatly quicken the reduction of the products and makes the present machine more rapid and effective, than any other food-chopping device, known to me.

The casing 2 is preferably formed with an integral standard 4, which in turn is formed with the stationary jaw or member, as 5, of a vise or clamp, by which the grinder may be attached to a table or bench, as A. The standard 4 also supports the usual movable jaw, as 5', of the clamp, which may be locked to the standard by any suitable means, as by a handle 5a.

The meat or other food products which are more or less reduced by the conveyor 3, as explained, upon being discharged from the casing 2 via the openings 3x, immediately encounter an independent external disc-shaped cutting member 6, which is disposed in axial alignment with the conveyor for still further refining the said products. The disc 6, which is preferably non-rotatable, is adjustably supported by a holder 7 that extends horizontally across the enlarged end of casing 2, one end of said holder being hinged at one side of the casing to an integral perforated lug 7', by a screw 7a. The opposite end of the holder or gate 7 is formed with a fork 7b that straddles a tooth 7c of the casing. This enables the holder to be held in the operative position, shown by the full-line in Figs. 1, 2, 5 and 6, by gravity. The disc 6 is preferably formed with a threaded axial stem, as 6', which is loosely disposed in a smooth bored hole or socket 7d of the holder and is engaged by a circular nut 8, which plays in a slot 8'. The turning of the nut in opposite directions moves the disc 6 towards and away from the head 3f of the worm, as shown by full and dotted lines in Figs. 1, 5 and 6, for varying the state of the finished products. The disc 6 is formed with opposing peripheral notches, as 6a, which engage parallel guide portions 7e of the holder to afford adjustable play and also to prevent rotation of said disc. The grinding or cutting face of the disc 6 is preferably formed with cutting ribs, as 6b, that are disposed in parallel and oblique order, the said angle preferably being about 45°. Each rib 6b is formed with cutting edges 6c—6d, which for approximately one-half of their length slant to one side and for their remainder slant to the opposite side. By this arrangement, the ribs 6b of disc 6 always appear in the same relation to the rotating head 3f of the conveyor, and as the coarsely ground products are forced by the worm against the said disc, the latter performs a continuous and even cutting during the chopping operations. By disposing the ribs 6b, as herein shown, the products tend to move downwardly obliquely towards one side of the machine by gravity, assisted by the normal pressure of the conveyor. To facilitate this angular discharge of the products, the top of disc 6 is formed with a crescent-shaped peripheral lip or flange 6e, which slightly overhangs the knife-like ribs 6b and prevents escape of the products at any other angle than as described. When the lip 6e is brought into contact with the adjacent end of the casing 2, as in Figs. 5 and 6, the openings or grooves between the ribs 6b will admit of a slow feed of the products by the conveyor. This relatively fine or close adjustment of the disc 6 insures the reduction of the products to their finest state. Ordinarily, the disc 6 is more coarsely adjusted, as shown by Figs. 1, 5 and 6. Obviously, this chopper is equally adaptable for grinding coffee and other dry products, as well as for chopping and mincing meats, green vegetables and the like. The disc 6, is preferably imperforate and restricted to cutting rather than merely forcing the products through die-like slots or holes, which are liable to allow relatively long stringy portions of the products to pass through the final stage of reduction without being disintegrated. In order to insure a more complete final grinding by the disc 6 and head 3f, the outer face of said head is preferably formed with shallow flutes or grooves, as f, in order to positively feed the products discharged through the openings 3x against the knife-like ribs 6b, and thereby effectually and evenly reduce said products.

The cutting spurs 2d—3d and the spiral blades 3e effect the substantial reduction of the products, ready for ordinary use, wholly within the casing 2, and by the employment of but a single movable reducing element, viz: the worm 3.

The present device may be readily and quickly taken apart for cleaning or repairs, by simply removing the crank x, then swinging the holder 7 upwardly on its pivot 7a, as shown in Fig. 2, and finally tilting the casing 2 in the proper direction to effect the ejectment of the conveyor by gravity. By this arrangement, the parts of the device may be readily and quickly cleansed or sterilized and re-assembled.

Having thus described my invention, what I claim, is—

1. A meat chopper comprising a hollow casing having an expanded bore near its discharge end being formed with cutting spurs, a worm conveyor rotatable in said casing having an enlargement corresponding to said expanded bore, said conveyor having radial spurs disposed in shearing relation to the spurs of the casing, and having spiral cutting blades between the spurs and said discharge end, said conveyor adjacent said discharge end being formed with discharge openings and having a plurality of flutes on its end face, an external cutting member to refine products primarily reduced by the conveyor and casing, having a parallel arrangement of oblique cutting ribs, and means to secure the member to the casing with its ribs confronting the flutes of the conveyor, whereby to discharge the refined products at an angle to the axis of the conveyor.

2. A meat chopper including a hollow casing having a feed hopper near one end and an enlarged bore adjacent the opposite end, and having parallel longitudinal flutes, a worm conveyor rotatable in said casing having an enlarged portion adjacent said opposite end and a plurality of radial openings to discharge the products from the casing, said conveyor being formed with spiral blades that cut and feed the products towards the corresponding openings, an external grinding disc having parallel cutting ribs of varying depths that face the adjacent end of the conveyor and cooperate with said end to refine the products ejected from the casing, a holder swingably connected to the casing for supporting said disc, means to move said disc towards and away from the end of the conveyor for predetermining the fineness of the finished product, and means to deflect the finished product downwardly obliquely towards one side of the machine.

3. A meat chopper including a casing, a worm conveyor rotatable in the casing and having cutting means on its end face, a member disposed in confronting relation to said conveyor and having cutting means for cooperation with the cutting means of the conveyor, a holder having a part pivotally connected to the casing for movement in a plane transverse to the longitudinal axis of the casing, means to support said holder from the casing at a point diametrically opposite its pivotal point so as to restrict downward movement of the holder, means to connect said member to the holder against rotation but to enable the member to move toward and away from the conveyor, and means to effect adjustment of the member relative to the cutting means of the conveyor.

4. A meat chopper including a casing, a worm conveyor rotatable in the casing and having cutting means, and a member disposed in confronting relation to said conveyor and having a series of parallel cutting ribs which coact with the cutting means of the conveyor whereby to discharge the material at an angle to the axis to the conveyor, said ribs each slanting to one side for approximately half their length and slanting to the other side for the remainder of their length.

5. A meat chopper including a casing, a worm conveyor rotatable in the casing and having cutting means, a member disposed in confronting relation to said conveyor and having a series of parallel cutting ribs which coact with the cutting means of the conveyor whereby to discharge the material at an angle to the axis to the conveyor, said ribs each slanting to one side for approximately half their length and slanting to the other side for the remainder of their length.

6. A meat chopper including a casing, a worm conveyor rotatable in the casing and having cutting means on its end face, a member disposed in confronting relation to said cutting means and having a series of parallel cutting ribs to feed the product downwardly said ribs each slanting to one side for approximately half their length and slanting to the other side for the remainder of their length, means to secure said member with its ribs in confronting relation to the cutting means of the conveyor, said conveyor having radial discharge openings and having cutting ribs on its end face extending parallel to a diameter of the end face of the conveyor.

BERNARD DWOFSKY.